United States Patent Office 3,434,975
Patented Mar. 25, 1969

3,434,975
MOLYBDENUM-CONTAINING CATALYST AND
METHOD FOR THE PREPARATION THEREOF
Ming Nan Sheng, Cherry Hill, N.J., and John G. Zajacek,
St. Davids, Pa., assignors to Atlantic Richfield Company, Philadelphia, Pa., a corporation of Pennsylvania
No Drawing. Filed Dec. 27, 1965, Ser. No. 516,778
Int. Cl. B01j 11/32, 11/00; C07d 1/08
U.S. Cl. 252—431                                10 Claims

ABSTRACT OF THE DISCLOSURE

Molybdenum-containing catalysts useful in the epoxidation of olefinic compounds with an organic hydroperoxide and soluble in the reaction medium of such epoxidation reactions produced by reacting molybdenum metal with an organic hydroperoxide, peracid or hydrogen peroxide in the presence of a saturated alcohol having from 1 to 4 carbon atoms.

---

This invention relates to a molybdenum-containing catalyst useful as an organic soluble epoxidation catalyst and to the method for producing such catalyst. More particularly it relates to a novel molybdenum-containing catalyst which is soluble in organic solvents used in epoxidation reactions and to the method of making it from metallic molybdenum.

It has been found that molybdenum-containing catalysts can be utilized to give high yields of epoxides in the liquid phase oxidation of olefins with organic hydroperoxides. The reaction is carried out in an organic solvent, frequently an alcohol, and accordingly it is preferable to employ as the catalyst a molybdenum compound which is soluble in the reaction medium. Molybdenum hexacarbonyl is representative of such a catalyst and is soluble in a wide variety of organic solvents. It can be used advantageously, therefore, as a catalyst in the liquid phase epoxidation of olefins with hydroperoxides. This compound, however, is exceedingly expensive and based on the molybdenum content of the compound, has a cost several times that of metallic molybdenum.

The present invention is concerned with a method for making a molybdenum catalyst which is soluble in the same organic solvents used in the epoxidation reaction. Moreover, since the source of the molybdenum is metallic molybdenum it is relatively inexpensive, yet the catalyst prepared therefrom in accordance with this invention has the advantage of being soluble in a solution which is compatible with the reaction medium in which it is to be utilized.

It is an object of this invention, therefore, to provide a method for making a novel molybdenum-containing catalyst useful for the epoxidation of olefins.

It is a further object of this invention to provide a method of making a novel molybdenum-containing catalyst from metallic molybdenum.

It is a further object of this invention to provide a novel molybdenum-containing catalyst which is soluble in organic solvents compatible with the olefin epoxidation reaction medium wherein the catalyst is to be utilized.

Other objects of this invention will be apparent from the description and claims that follow.

In accordance with this invention metallic molybdenum is reacted with a peroxy compound, i.e., an organic hydroperoxide, hydrogen peroxide or organic peracid in the presence of a low molecular weight monohydroxy or polyhydroxy alcohol at temperatures ranging between about 25° C. and 100° C. In addition, it is sometimes desirable to carry out the reaction in the presence of a solvent such as tertiary butyl alcohol, benzene, ethyl acetate or the like.

The organic hydroperoxides which are utilized in this invention are characterized by being liquid at the reaction conditions and by having a structure ROOH, wherein R may be alkyl, alkenyl, aryl, alkaryl, aralkyl, cycloalkyl, cycloalkenyl and similar radicals which also contain functional groups. Examples of such hydroperoxides which may be employed are tertiary butyl hydroperoxide, tertiary amyl hydroperoxide, cumene hydroperoxide, tetralin hydroperoxide, alpha-hydroperoxy diisopropylketone, the hydroperoxide of 2-methylbutene-2, the hydroperoxide of octene-1, the hydroperoxide of 2,6-di-tertiary butyl paracresol, and the like. Tertiary butyl hydroperoxide is preferred since upon reduction it is converted into the corresponding alcohol which is a convenient solvent for the epoxidation reaction. The hydrogen peroxide is preferably a 30 percent solution. Included among the various peracids which may be utilized are performic acid, peracetic acid, trifluoroperacetic acid, perbenzoic acid and the like. Of these peracetic acid is a particularly useful example.

The low molecular weight monohydroxy alcohols which are suitable for use in the process of this invention include methyl alcohol, ethyl alcohol, isopropyl alcohol, n-butyl alcohol and tertiary butyl alcohol. The $C_5$ and higher monohydroxy alcohols are not suitable. The polyhydroxy alcohols which are suitable include ethylene glycol, propylene glycol, 1,2-butylene glycol, and glycerol. In general, alcohols, either mono- or polyhydroxy, having from 1 to 4 carbon atoms are suitable. The higher molecular weight compounds such as 1,2-octanediol are not suitable.

The solvents which may be employed include tertiary butyl alcohol, isooctane (2,2,4-trimethylpentane), ethyl acetate, benzene and the like. The molybdenum metal may be in the form of lumps, sheets, foil or powder. The powdered material is preferable because of its lower cost and in addition it offers the greatest surface per unit volume.

The reaction may be carried out at atmospheric pressure, or when carried out at the higher temperatures which would cause volatilization of the alcohols sufficient pressure may be utilized to maintain the reactants in the liquid phase. Thus, for example, if methyl alcohol is the lower alcohol which is utilized in the process, at temperatures of 63° C. and below, atmospheric pressures may be utilized, however, at temperatures above about 63° C. superatmospheric pressure is required to prevent the methyl alcohol from vaporizing. After the reaction has been carried out for the desired length of time the solution is filtered to separate the undissolved molybdenum and is thereafter suitable for use as the catalyst solution in the epoxidation reaction.

The following examples are provided for the purpose of illustrating the invention in greater detail. The invention, however, is not limited to these illustrative examples.

In each of the following examples the weight percent of molybdenum in the final solution was determined by polarographic analysis utilizing conventional techniques.

EXAMPLE I

In order to study the effect of various alcohols on the reaction, runs were carried out employing 40 grams of the alcohol, 2.5 grams of tertiary butyl hydroperoxide, 0.2 gram of molybdenum powder with the reaction being carried out in sealed tubes at 60° C. for 45 minutes with occasional shaking. In this example and in the following examples, the molybdenum powder had a particle size such that it passed through a 200 mesh sieve of the Standard Screen Scale, i.e., an opening of 0.074 millimeter. The results of these experiments are shown in Part A of Table I.

A second series of runs were carried out employing 20 grams of tertiary butyl alcohol, 2.5 grams of tertiary butyl hydroperoxide, 2.5 grams of the alcohol being studied and 0.2 gram of molybdenum powder. These runs also were carried out in sealed tubes at 60° C. for 45 minutes with occasional shaking. The results are shown in Part B of Table I.

TABLE I

| Run No. | A | | Run No. | B | |
|---|---|---|---|---|---|
| | Alcohol | Wt. percent Mo | | Alcohol | Wt. percent Mo |
| 1 | Methyl | 0.0280 | 6 | Methyl | [2] 0.034 |
| 2 | Ethyl | 0.0128 | 7 | Ethyl | 0.0131 |
| 3 | i-Propyl | 0.0110 | 8 | i-Propyl | 0.0044 |
| 4 | n-Butyl | 0.0028 | 9 | n-Butyl | 0.0015 |
| 5 | t-Butyl | [1] 0.0068 | | | |

[1] One of 2 runs, mechanical agitation.
[2] Ave. of 3 runs.

It will be seen from these results that methyl and ethyl alcohol are preferred but that tertiary butyl alcohol may be substituted as a solvent for a part of the other alcohols and that when such a combination is used somewhat more molybdenum is dissolved in the case of the two lower alcohols. It was found that when a run was carried out employing benzene as the solvent without any alcohol that only trace amounts of molybdenum were dissolved, i.e., less than about 0.0006 weight percent.

EXAMPLE II

In order to show that other solvents may be utilized instead of the tertiary butyl alchol, runs were carried out employing 20 grams of the solvent, 2.5 grams of methyl alcohol, 2.5 grams of tertiary butyl hydroperoxide and 0.2 gram of molybdenum powder. These runs also were carried out in sealed tubes at 60° C. for 45 minutes with occasional shaking. With isooctane(2,2,4-trimethylpentane) as the solvent, Run No. 10, the solution contained 0.0047 weight percent molybdenum; with ethyl acetate, Run No. 11, it contained 0.0159 weight percent molybdenum; and with benzene, Run No. 12, it contained 0.016 weight percent molybdenum. These data show that solvents other than tertiary butyl alcohol may be employed with good results.

EXAMPLE III

The effect of temperature on the reaction was studied by carrying out a series of runs wherein in each run 20 grams of tertiary butyl alchol, 2.5 grams of methyl alcohol, 2.5 grams of tertiary butyl hydroperoxide, and 0.2 gram of molybdenum powder were reacted at the temperatures and for the times shown in Table II. These reactions also were carried out in sealed tubes with occasional shaking. This technique was used throughout all the examples, except where noted otherwise.

TABLE II

| Run No. | Reaction temp., °C. | Reaction time, hrs. | Wt. percent Mo | Wt. percent hydroperoxide decomposed |
|---|---|---|---|---|
| 13 | 25 | 64 | 0.837 | 28 |
| 14 | 35 | 45 | 0.748 | 29 |
| 15 | 50 | 19 | 0.837 | |
| 16 | 80 | 0.5 | 0.667 | 34 |
| 17 | 100 | 0.25 | 0.238 | 49 |
| 18 | 100 | 0.25 | 0.251 | 50 |
| 19 | 100 | 0.5 | 0.234 | 84 |
| 20 | 100 | 0.5 | 0.225 | 84 |
| 21 | 63 | 0.75 | 0.060 | 3 |
| 22 | 63 | 0.75 | 0.087 | 5 |

It will be seen that low temperatures may be employed if long times are utilized and that up to about 80° C. temperature and time may be varied to give about a constant amount of molybdenum in the solution. At 100° C., however, the temperature is above the optimum so that the amount of molybdenum in the solution is less than at the lower temperatures. This may be explained by the fact that a greater amount of hydroperoxide is decomposed at 100° C. and therefore is not available to react with the molybdenum to put the molybdenum into solution and form the molybdenum-containing catalyst. At 80° C. and below the amount of hydroperoxide decomposed is considerably lower so that greater amounts of molybdenum are put into solution. At about 63° C. in Run Nos. 21 and 22, which were carried out for 45 minutes, only between 3 and 5 percent of the hydroperoxide was decomposed and the amount of molybdenum in solution was lower than the other runs which were carried out for longer times.

EXAMPLE IV

The catalyst solution from Run Nos. 13, 16, 17 and 22 were utilized in epoxidation reactions to determine their efficiency for the reaction. With the catalyst from Run No. 13, 0.31 gram of the catalyst solution, 0.45 gram of tertiary butyl hydroperoxide and 4.0 grams of octene-1 were reacted for 60 minutes at 100° C. A 76 weight percent yield of epoxide based on the total amount of hydroperoxide at the start of the reaction (the sum of the undecomposed hydroperoxide in the catalyst solution and the hydroperoxide added) was obtained, with 10 weight percent of the hydroperoxide remaining unreacted. In a second run on the catalyst from Run 13, 0.13 gram of catalyst solution, 0.45 gram tertiary butyl hydroperoxide, 1.7 grams tertiary butyl alcohol and 2.3 grams of octene-1 were reacted for 60 minutes at 100° C. A yield of 82 weight percent epoxide based on the total amount of hydroperoxide at the start of the reaction was obtained with 9.6 weight percent of the hydroperoxide remaining unreacted. In another epoxidation reaction 0.32 gram of the catalyst solution from Run No. 16, 0.45 gram of tertiary butyl hydroperoxide, 1.68 grams of tertiary butyl alcohol, and 2.3 grams of octene-1 were reacted at 100° C. for 60 minutes. A yield of 80 weight percent epoxide based on the total hydroperoxide starting material was obtained with 20 weight percent of the hydroperoxide remaining unreacted.

A 2.0 gram sample of the catalyst solution from Run No. 17, 0.4 gram of tertiary butyl hydroperoxide, and 2.3 grams of octene-1 were reacted at 100° C. for 60 minutes. A yield of 50 weight percent epoxide was obtained based on the total hydroperoxide starting material with 22 weight percent hydroperoxide remaining unreacted. A run identical to that using the catalyst from Run No. 17 was carried out with the catalyst from Run No. 22 and a yield of 82 weight percent epoxide was obtained with 14 weight percent hydroperoxide remaining unreacted. Run No. 17 was not thought to give an inferior catalyst but rather the amount of molybdenum in solution during the epoxidation was above the optimum so that hydroperoxide was decomposed before it could react with the olefin.

These experiments demonstrate that the catalyst prepared in accordance with this invention is a superior catalyst for the epoxidation of olefins.

EXAMPLE V

Several runs were carried out utilizing various hydroperoxides. In each run 0.2 gram of molybdenum powder was employed together with 2.5 grams of methyl alcohol and 20 grams of tertiary butyl alcohol except in the run utilizing tetralin hydroperoxide wherein the amount of methyl alcohol was 1.3 grams and the amount of tertiary butyl alcohol was 10 grams. In Table III the hydroperoxide employed and the amount thereof, the reaction temperature and time are shown together with the results, i.e., the weight percent molybdenum dissolved in the final solution and the percent of the hydroperoxide decomposed during the reaction. In the case of hydrogen peroxide and peracetic acid, low temperatures and correspondingly long times were employed because of the unstable nature of these compounds. The reaction was carried out in a stirred 50 ml. round bottom flask.

TABLE III

| Hydroperoxide and amount in grams | Reaction temp., °C. | Reaction time min. | Wt. percent Mo | Wt. percent hydroperox. decomp. |
|---|---|---|---|---|
| t-Amyl, 2.5 | 59–62 | 60 | 0.124 | 16 |
| Tetralin, 2.2 | 57–58 | 60 | 0.079 | 12 |
| Cumene, 2.5 | 61 | 120 | 0.0014 | <1 |
| H₂O₂ (30%), 1.3 | 25 | 180 | 0.70 | 46.8 |
| 2-methyl butene-2, 2.6 | 60 | 135 | 0.0352 | 12.4 |
| Peracetic acid (40%), 2 | 25 | 1,200 | 0.418 | 20 |
| t-Butyl, 2.5 | 62 | 45 | 0.37 | 16.6 |

It will be seen that each of these peroxy compounds can be utilized to produce the molybdenum catalyst which is soluble in organic solvents in accordance with this invention.

EXAMPLE VI

Several runs were carried out wherein the methyl alcohol was varied in order to determine its effect on the amount molybdenum dissolved in the solution. In each of these runs 2.5 grams of tertiary butyl hydroperoxide, 20 grams of tertiary butyl alcohol and 0.2 gram of molybdenum powder were reacted with the various amounts of methyl alcohol shown in Table IV. The reactions were carried out at 63° C. for 45 minutes and at 100° C. for 15 mniutes. The experimental conditions and results are shown in Table IV.

TABLE IV

| Reaction conditions | Grams methanol | Wt. percent Mo | Wt. percent hydroperox. decomp. |
|---|---|---|---|
| 63° C., 45 min | 1 | 0.118 | 6 |
| 63° C., 45 min | 0.5 | 0.052 | 1 |
| 63° C., 45 min | 0.26 | 0.0093 | <1 |
| 100° C., 15 min | 0.5 | 0.277 | 48 |
| 100° C., 15 min | 0.1 | 0.241 | 45 |
| 100° C., 15 min | 0.05 | 0.068 | 44 |

It will be seen that, in general, as the quantity of methyl alcohol is increased the amount of molybdenum catalyst as measured by the amount of molybdenum dissolved in the solution increases.

EXAMPLE VII

In order to determine the effect of varying the quantity of hydroperoxide on the quantity of molybdenum dissolved in the final solution, several runs were carried out wherein 2.5 grams of methyl alcohol, 20 grams of tertiary butyl alcohol and 0.2 gram of molybdenum powder were reacted together with the amounts of tertiary butyl hydroperoxide shown in Table V. The runs were carried out at 63° C. for 45 minutes and at 100° C. for 15 minutes. The conditions and results are shown in Table V.

TABLE V

| Reaction conditions | Grams t-butyl hydroperox. | Wt. percent Mo | Wt. percent hydroperox. decomp. |
|---|---|---|---|
| 63° C., 45 min | 1 | 0.064 | 3 |
| 63° C., 45 min | 0.5 | 0.028 | 16 |
| 63° C., 45 min | 0.25 | 0.013 | 24 |
| 100° C., 15 min | 0.5 | 0.332 | 20 |
| 100° C., 15 min | 0.25 | 0.0166 | 10 |
| 100° C., 15 min | 0.05 | 0.0054 | 18 |

It will be seen that, in general, as the quantity of hydroperoxide is increased the amount of molybdenum dissolved in the solution increases.

EXAMPLE VIII

Several runs were carried out wherein the reaction time was varied in order to determine the effect of time on the quantity of molybdenum dissolved in the solution. In the first set of runs 0.5 gram methyl alcohol, 2.5 grams of tertiary butyl hydroperoxide, 20 grams of tertiary butyl alcohol and 0.2 gram of molybdenum powder were reacted at 63° C. for the times shown in Table VI. The results obtained are also set forth in this table. In two other runs, 0.25 gram of methyl alcohol, 1 gram of tertiary butyl hydroperoxide, 20 grams of tertiary butyl alcohol and 0.2 gram of molybdenum powder were reacted at 100° C. for the times shown in Table VI. The results obtained are also shown in Table VI.

TABLE VI

| Reaction temp., °C. | Reaction time, min. | Wt. percent Mo |
|---|---|---|
| 63 | 60 | 0.0338 |
| 63 | 90 | 0.1040 |
| 63 | 120 | 0.1380 |
| 63 | 150 | 0.2500 |
| 100 | 45 | 0.1830 |
| 100 | 120 | 0.0330 |

It will be seen that at the lower temperature as the time increased, the quantity of molybdenum in solution increased, but at the higher temperature as the time increased the quantity of molybdenum decreased, indicating that at the higher temperatures, longer times cause more decomposition of the hydroperoxide with the result that less molybdenum is converted into the soluble catalyst. Moreover, it was found in the run at 100° C. for 120 minutes that a blue precipitate of an insoluble molybdenum material was formed indicating further reaction between the soluble molybdenum catalyst and the hydroperoxide.

EXAMPLE IX

Runs were carried out utilizing glycols instead of the lower molecular weight monohydric alcohols. In these experiments 2.5 grams of the glycol, 2.5 grams of tertiary butyl hydroperoxide, 20 grams of tertiary butyl alcohol and 0.2 gram of molybdenum powder were reacted at 60° C. for 45 minutes. With ethylene glycol the final solution contained 0.022 weight percent molybdenum. With propylene glycol the final solution contained 0.0093 weight percent molybdenum and with octanediol-1,2 the final solution contained 0.0016 weight percent molybdenum. These experienmts demonstrate that polyhydric alcohols may be substituted for the lower molecular weight monohydric alcohols but that only the compounds having up to 4 carbon atoms are suitable.

EXAMPLE X

The effect of time on the amount of molybdenum in solution was studied utilizing propylene glycol as the alcohol. In each run 2.5 grams of propylene glycol, 2.5 grams of tertiary butyl hydroperoxide, 20 grams of tertiary butyl alcohol and 0.2 gram of molybdenum powder were reacted at 60° C. for the times shown in Table VII. The amount of molybdenum in the final solution for each run is also shown in the same table.

TABLE VII

| Reaction time, hours: | Weight percent, Mo |
|---|---|
| 1 | 0.0137 |
| 2 | 0.0294 |
| 3 | 0.0960 |
| 4 | 0.1540 |
| 5 | 0.2000 |
| 6 | 0.2550 |
| 7 | 0.4070 |

It will be seen that as the reaction time increases the amount of molybdenum in the final solution also increases as in Example VIII wherein methyl alcohol was employed.

Example XI

A mixture consisting of 240 grams of tertiary butyl alcohol, 30 grams of methyl alcohol and 30 grams of tertiary butyl hydroperoxide was prepared. Portions consisting of 23.4 grams of this mixture were reacted with 0.2 gram of molybdenum powder at 60° C. for 45 minutes, 90 minutes and 120 minutes, respectively, in order to prepare catalyst solutions of different concentrations. In the 45 minute runs an average of 0.034 weight percent molybdenum was contained in the final solution. This catalyst solution was designated catalyst A. In the 90 minute runs, the final solutions averaged 0.173 weight percent molybdenum. The catalyst solution of this concentration was designated catalyst B. In the 120 minute runs the final solutions averaged 0.209 weight percent molybdenum and these solutions were designated catalyst C. These catalysts were tested for their ability to epoxidize olefins. In Table VIII are shown the amount of catalyst solution, the amount of added tertiary butyl alcohol, the amount of added tertiary butyl hydroperoxide and the amount of octene-1 which were reacted at 100° C. in sealed tubes. In addition the percent epoxide based on the total amount of hydroperoxide charged (including the amount added and the amount undecomposed in the catalyst solution) is set forth in Table VIII.

TABLE VIII

| Catalyst and amt. in grams | G. of t-butyl alcohol | Yield of epoxide [1] | Wt. percent hydroperoxide decomp. |
|---|---|---|---|
| A, 2.0 | 0 | 67 | 72 |
| B, 0.35 | 1.65 | 65 | 70 |
| C, 0.31 | 1.7 | 65 | 70 |

[1] Based on hydroperoxide charged to reaction.

It will be seen that by adjusting the concentration of each catalyst solution so that each run contained approximately the same concentration of catalyst, the same percent epoxide yield is obtained. These experiments also demonstrate the usefulness of the catalyst of the instant invention in the epoxidation of olefins.

It is apparent from the examples that a temperature range of from 25° C. to 100° C. may be employed but that from 60° C. to 80° C. is the preferred range, since in this temperature range a sufficiently high concentration of molybdenum in solution is obtained in a reasonably short time, i.e., from 45 minutes to 2 hours. Lower temperatures require much longer reaction times, whereas at the higher temperatures the hydroperoxide decomposes with the result that there is in many instances an actual decrease in the concentration of molybdenum in the final solution. Although reaction times ranging from a few minutes, e.g., 15 minutes, at the higher temperatures to several hours at the lower temperatures may be employed, temperatures in the range of from 45 minutes to 2 hours are preferred when the preferred temperatures are employed. The reaction may be carried out at atmospheric pressure or at a pressure sufficient to retain the solvents in the liquid phase.

The quantities of reactants may be varied over wide ranges, however, in general a weight ratio of molybdenum metal to hydroperoxide in the range of from about 1:5 to 1:20 is preferred. The weight ratio of molybdenum metal to saturated alcohol also may vary over wide limits, a preferred range being, however, from 1:50 to 1:200. As has been demonstrated, the alcohol may be entirely a low molecular weight saturated alcohol or saturated glycol, or equally good results are obtained when from 80 to 99 weight percent of the total alcohol is a saturated alcohol such as tertiary butyl alcohol, for example, and the remainder of the alcohol is a low molecular weight saturated alcohol such as methyl alcohol or propylene glycol. With such a mixture of alcohols the ratio of molybdenum to methyl alcohol may be as low as 1:4 with the molybdenum to tertiary butyl being 1:100. The foregoing ranges of amounts and conditions are merely preferred ranges wherein a concentration of molybdenum in the final solution is obtained which is low enough to produce an excellent epoxidation catalyst. As shown by the examples, more severe conditions will produce higher concentrations of molybdenum in the final solution and likewise by changing the ratios of the amounts of hydroperoxide and alcohol, higher concentrations of molybdenum in the final solution may be obtained. High concentrations of the molybdenum-containing catalyst are not necessary, however, to produce the best catalyst for the epoxidation reaction. Lower concentrations of molybdenum in the final solution constitute a catalyst which will give maximum yields and conversions of epoxides from olefins with minimum destruction of the hydroperoxide.

The molybdenum catalyst made in accordance with this invention has been found to be suitable for the epoxidation of propylene to produce propylene oxide, for example, at high yields and conversions. In general the catalyst of this invention is suitable for the epoxidation of compounds having the formula

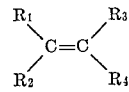

wherein $R_1$, $R_2$, $R_3$ and $R_4$ may be hydrogen, alkyl, aryl, alkaryl, aralkyl, alkenyl, alkadienyl or similar radicals having functional groups. The acyclic olefinic hydrocarbons which may be epoxidized are the aliphatic compounds including the normally gaseous olefins such as ethylene, propylene, the butylenes and the higher olefins including the liquid and high molecular weight solid olefins. Monoolefinic hydrocarbons, diolefinic hydrocarbons and polyolefinic hydrocarbons also can be epoxidized by the catalyst of this invention.

The molybdenum catalyst of this invention gives yellow colored solutions when it is dissolved in solvents such as those set forth herein. The catalyst can be recrystallized from methyl alcohol, ethyl alcohol, ethyl acetate and similar solvents or from mixtures of such solvents. A molybdenum catalyst prepared in the manner set forth in Run Nos. 21 and 22 of Example III was recrystallized from methyl alcohol. It was found to have a density of 1.87 and decomposed without melting at about 130° C. A molecular weight determination made on a conventional commercially available osmometer gave a value for the molecular weight of approximately 360. A single crystal of the molybdenum catalyst was subjected to X-ray diffraction measurements and it was found to have three unit cell repeat distances of 18.8 Angstrom units, 15.4 Angstrom units and 13.9 Angstrom units, respectively.

We claim:
1. A method of making a molybdenum-containing catalyst useful as an organic soluble epoxidation catalyst which comprises reacting molybdenum metal with a peroxy compound selected from the group consisting of organic hydroperoxides, organic peracids and hydrogen peroxide in the presence of at least one saturated alcohol having from 1 to 4 carbon atoms in the molecule and at a temperature in the range of from about 25° C. to 100° C.

2. The method according to claim 1 wherein the temperature is in the range of from 60° C. to 80° C.

3. The method according to claim 1 wherein the peroxy compound is tertiary butyl hydroperoxide.

4. The method according to claim 1 wherein the peroxy compound is hydrogen peroxide.

5. The method according to claim 1 wherein the peroxy compound is peracetic acid.

6. The method according to claim 1 wherein the saturated alcohol is methyl alcohol.

7. The method according to claim 1 wherein the saturated alcohol is propylene glycol.

8. The method according to claim 1 wherein one of the saturated alcohols is methyl alcohol and the other saturated alcohol is tertiary butyl alcohol and the tertiary butyl alcohol ranges from about 80 weight percent to 99 weight percent of the amount of the two alcohols.

9. The method according to claim 1 wherein one of the saturated alcohols is propylene glycol and the other saturated alcohol is tertiary butyl alcohol and the tertiary butyl alcohol ranges from about 80 weight percent to 99 weight percent of the amount of the two alcohols.

10. The molybdenum-containing catalyst produced in accordance with the method of claim 1.

References Cited

UNITED STATES PATENTS

| | | | | |
|---|---|---|---|---|
| 2,649,463 | 8/1953 | Skelly | | 260—348.5 |
| 2,870,171 | 1/1959 | Gable | | 252—467 X |
| 3,156,709 | 11/1964 | Allan | | 260—348.5 |
| 3,300,463 | 1/1967 | De La Mare | | 252—431 X |
| 3,321,493 | 5/1967 | Beesley et al. | | 260—348.5 |

DANIEL E. WYMAN, *Primary Examiner.*

C. F. DEES, *Assistant Examiner.*

U.S. Cl. X.R.

252—467; 260—348.5, 429